(12) United States Patent
Hagen et al.

(10) Patent No.: US 9,216,927 B2
(45) Date of Patent: Dec. 22, 2015

(54) GYPSUM-CONTAINING CONSTRUCTION MATERIAL COMPOUNDS

(75) Inventors: Wolfgang Hagen, Meerbusch (DE); Peter Fritze, Haiming (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/128,593

(22) PCT Filed: Jun. 29, 2012

(86) PCT No.: PCT/EP2012/062717
§ 371 (c)(1),
(2), (4) Date: Dec. 20, 2013

(87) PCT Pub. No.: WO2013/004621
PCT Pub. Date: Jan. 10, 2013

(65) Prior Publication Data
US 2014/0121303 A1 May 1, 2014

(30) Foreign Application Priority Data
Jul. 1, 2011 (DE) .................. 10 2011 078 531

(51) Int. Cl.
| | | |
|---|---|---|
| *C04B 24/42* | (2006.01) | |
| *C04B 28/14* | (2006.01) | |
| *C04B 20/10* | (2006.01) | |
| *C04B 28/02* | (2006.01) | |
| *C04B 28/16* | (2006.01) | |
| C04B 111/00 | (2006.01) | |
| C04B 111/27 | (2006.01) | |
| C04B 111/20 | (2006.01) | |
| C04B 111/62 | (2006.01) | |
| C04B 111/72 | (2006.01) | |

(52) U.S. Cl.
CPC ............ *C04B 28/14* (2013.01); *C04B 20/10* (2013.01); *C04B 28/02* (2013.01); *C04B 28/144* (2013.01); *C04B 28/145* (2013.01); *C04B 28/16* (2013.01); *C04B 2111/0062* (2013.01); *C04B 2111/00517* (2013.01); *C04B 2111/00637* (2013.01); *C04B 2111/00672* (2013.01); *C04B 2111/27* (2013.01); *C04B 2111/29* (2013.01); *C04B 2111/62* (2013.01); *C04B 2111/72* (2013.01); *Y02W 30/92* (2015.05); *Y02W 30/94* (2015.05); *Y02W 30/96* (2015.05)

(58) Field of Classification Search
CPC .. C04B 24/42; C04B 24/2623; C04B 24/223; C04B 24/2611; C04B 24/2641; C04B 24/2676; C04B 24/2682; C04B 24/383; C04B 14/42; C04B 14/06; C04B 14/16; C04B 14/042; C04B 14/066; C04B 14/08; C04B 14/10; C04B 14/106; C04B 14/14; C04B 14/20; C04B 14/22; C04B 14/26; C04B 14/28; C04B 14/322; C04B 2103/12; C04B 2103/22; C04B 2103/50; C04B 22/064; C04B 22/143; C04B 22/145; C08B 24/42
USPC .......................................................... 524/5
See application file for complete search history.

(56) References Cited

U.S. PATENT DOCUMENTS

| | | | |
|---|---|---|---|
| 4,494,990 A * | 1/1985 | Harris ................................ 524/5 |
| 4,851,047 A | 7/1989 | Demlehner et al. |
| 4,859,751 A | 8/1989 | Schulze et al. |
| 5,437,722 A | 8/1995 | Borenstein |
| 5,685,903 A | 11/1997 | Stav et al. |
| 6,241,815 B1 * | 6/2001 | Bonen ........................... 106/735 |
| 6,566,434 B1 | 5/2003 | Mayer et al. |
| 2002/0040666 A1 | 4/2002 | Eck et al. |
| 2002/0121326 A1 | 9/2002 | Adler et al. |
| 2006/0201395 A1 * | 9/2006 | Barger et al. .................. 106/705 |
| 2008/0066652 A1 * | 3/2008 | Fraser et al. .................. 106/709 |
| 2011/0196070 A1 | 8/2011 | Keller et al. |

FOREIGN PATENT DOCUMENTS

| | | |
|---|---|---|
| CN | 101844907 A | 9/2010 |
| CN | 102010171 A | 4/2011 |
| DE | 37 04 439 A1 | 8/1988 |
| DE | 198 53 196 A1 | 4/2000 |
| DE | 100 064 083 A1 | 7/2002 |
| DE | 10 2008 043 988 A1 | 5/2010 |
| EP | 0 149 098 A2 | 7/1985 |
| EP | 0 320 982 A1 | 6/1989 |
| GB | 1 497 125 | 1/1978 |
| KR | 2008 0009673 | 1/2008 |
| KR | 10-0943312 B1 | 2/2010 |
| WO | 98/52882 A1 | 11/1998 |
| WO | 00/30991 A1 | 6/2000 |
| WO | 01/19751 A1 | 3/2001 |
| WO | 2010012654 A1 | 2/2010 |

OTHER PUBLICATIONS

English machine translation of Kim et al., KR 100943312 B1 (Feb. 2010).*
English abstract for CN 101844907 A.
(Continued)

*Primary Examiner* — Peter F Godenschwager
(74) *Attorney, Agent, or Firm* — Caesar Rivise, PC

(57) ABSTRACT

The invention relates to gypsum-containing construction material compounds, containing gypsum, if necessary one or more polymers, if necessary one or more aggregates, and if necessary one or more additives, characterised in that the gypsum-containing construction material compounds contain one or more types of cement and one or more types of pozzolana.

16 Claims, No Drawings

(56) References Cited

OTHER PUBLICATIONS

English abstract for KR 10-0943312 B1.
English patent abstract for CN 102010171 A (2011).
English patent abstract for EP 0 320 982 A1.
English patent abstract for DE 10 2008 043 988 A1.
English patent abstract for DE 198 53 196 A1.
English patent abstract for KR 2008-000-9673 A1.
Fox T. G., Bull. Am. Physics Soc. 1, 3, p. 123 (1956).
Polymer Handbook 2nd Edition, J. Wiley & Sons, New York (1975).
E.W. Flick, Water Soluble Resins—an Industrial Guide, Noyes Publications, Park Ridge, N.J., 1991.
International Search Report for PCT/EP2012/062717 dated Oct. 31, 2012.

* cited by examiner

GYPSUM-CONTAINING CONSTRUCTION MATERIAL COMPOUNDS

BACKGROUND OF THE INVENTION

The present invention relates to gypsum-containing construction material compounds and to the use thereof for example as tile adhesives or self-leveling compounds.

Gypsum is a mineral binder, available inexpensively in large quantities for construction material compounds, and is obtainable with much less energy consumption in comparison to cement, in particular. The reason is that, in addition to naturally occurring gypsums, there are considerable quantities of gypsum obtained from flue gas desulfurization plants, and there is interest worldwide in using such gypsum. Consequently there is a great will to replace the energy-intensive material that cement represents by the less energy-intensive gypsum, and, in so doing, to reduce the overall energy consumption in the construction sector and thereby to make a contribution to more environmental building. A disadvantage of gypsum is its sensitivity to water, which causes edifices based on gypsum-containing construction material compounds to lose strength under humid or wet conditions. This deficiency is exacerbated by freeze/thaw exposure. To date, therefore, the range of application of gypsum in the construction sector has been considerably limited, and has focused essentially on the interior segment.

In order to adapt gypsum for use in the exterior segment, or even the wet segment, therefore, additional measures are needed. For this purpose, proposals have included the addition of hydrophobizing agents to gypsum-containing construction material compounds. Thus, for example, DE-A 3704439 proposes the use of silicones and siloxanes, stearates and paraffin waxes. The teaching of US 2002/0040666 is to apply organopolysiloxanes to organic or inorganic supports and to incorporate them in this form into gypsum-containing construction material compounds. U.S. Pat. No. 5,437,722 describes water-resistant gypsum products comprising paraffin, montan wax and polyvinyl alcohol as additives. EP-A 320982 discloses the use of redispersible powders based on vinyl acetate/Versatic acid-vinyl ester copolymers for rendering gypsum materials hydrophobic. EP-A 1133455 for this purpose recommends vinylaromatic-1,3-diene copolymers.

An improvement to the adhesion of gypsum compositions to surfaces of plastics or metals is taught by DE-A 10064083 through addition of salts of alkali metals or alkaline earth metals with short-chain fatty acids which are substituted by carboxyl groups. GB 1497125, lastly, is concerned with improving mechanical properties of gypsum mortars for tile adhesives.

A disadvantage of the aforementioned hydrophobizing agents is their in some cases not inconsiderable hydrophilicity, which imposes restrictions on the water resistance of corresponding construction products. Construction products formed from hydrophobized, gypsum-containing construction material compounds, furthermore, can in many cases be unsatisfactory in terms of their mechanical strength, particularly after storage under humid or wet conditions or after freeze/thaw exposure.

DESCRIPTION OF THE INVENTION

Against this background, the object was to provide gypsum-containing construction material compounds with which construction products can be obtained with high resistance to water or freeze/thaw storage, and also high mechanical strength.

The invention provides gypsum-containing construction material compounds, comprising gypsum, optionally one or more polymers, optionally one or more aggregates, and optionally one or more admixtures, characterized in that the gypsum-containing construction material compounds comprise one or more cements and one or more pozzolans.

Suitable gypsum is, for example, α- or β-hemihydrate ($CaSO_4 \cdot \frac{1}{2} H_2O$), dihydrate, anhydrite, or the calcium sulfate obtained during flue gas desulfurization (FGD gypsum). The gypsum may be present in the form, for example, of building gypsum, stucco gypsum, hard plaster of paris, or modeling gypsum. Use may also be made, however, of other types of gypsum, such as screeding gypsum or imitation marble.

The pozzolans are preferably selected from the group encompassing kaolin, microsilica, diatomaceous earth, flyash, finely ground trass, ground blast-furnace slag, finely ground glass, precipitated silica, and fumed silica. Particularly preferred pozzolans are kaolin, microsilica, flyash, ground blast-furnace slag, more particularly metakaolin.

Examples of suitable cements are Portland cement (CEM I), Portland slag cement (CEM II), blast-furnace cement (CEM III), pozzolanic cement (CEM IV), composite cement (CEM V), aluminate cement, more particularly calcium sulfoaluminate cement, Portland silicate dust cement, Portland slate cement, Portland limestone cement, trass cement, magnesia cement, phosphate cement, mixed cements, or filled cements. Preferred cements are Portland cement (CEM I), Portland slag cement (CEM II), or blast-furnace cement (CEM III).

The polymers are based in general on polymers of one or more ethylenically unsaturated monomers. Preferred ethylenically unsaturated monomers are selected from the group encompassing vinyl esters, (meth)acrylic esters, vinylaromatics, olefins, 1,3-dienes, and vinyl halides, and optionally further monomers copolymerizable therewith.

Suitable vinyl esters are, for example, those of carboxylic acids having 1 to 15 C atoms. Preferred are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 11 C atoms, as for example VeoVa9$^R$ or VeoVa10$^R$ (trade names of the company Resolution). Particularly preferred is vinyl acetate. Suitable monomers from the group of acrylic esters or methacrylic esters are, for example, esters of unbranched or branched alcohols having 1 to 15 C atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl meth-acrylate, and 2-ethylhexyl acrylate. Particularly preferred are methyl acrylate, methyl methacrylate, n-butyl acrylate, tert-butyl acrylate, and 2-ethylhexyl acrylate.

Preferred vinylaromatics are styrene, methylstyrene, and vinyltoluene. A preferred vinyl halide is vinyl chloride. The preferred olefins are ethylene and propylene, and the preferred dienes are 1,3-butadiene and isoprene.

Optionally it is also possible for 0 to 10 wt % of auxiliary monomers to be copolymerized, based on the total weight of the monomer mixture. Preference is given to using 0.1 to 5 wt % of auxiliary monomers. Examples of auxiliary monomers are ethylenically unsaturated monocarboxylic and dicarboxylic acids, preferably acrylic acid, methacrylic acid, fumaric acid, and maleic acid; ethylenically unsaturated carboxamides and carbonitriles, preferably acrylamide and acrylonitrile; monoesters and diesters of fumaric acid and maleic acid such as the diethyl and diisopropyl esters, and also maleic anhydride; ethylenically unsaturated sulfonic acids and their salts, preferably vinylsulfonic acid and 2-acrylamido-2-methylpropanesulfonic acid. Other examples are precrosslinking comonomers such as polyethylenically unsaturated comonomers, examples being diallyl phthalate, divinyl adipate, diallyl maleate, allyl methacrylate, or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether, or esters of N-methylolacrylamide, of N-methylol-methacrylamide, and of N-methylolallylcarbamate. Also suitable are epoxide-functional comonomers such as glycidyl methacrylate and glycidyl acrylate. Other examples are silicon-functional comonomers, such as acryloyloxypropyltri-(alkoxy)- and methacryloyloxypropyltri(alkoxy)-silanes, vinyltrialkoxysilanes and vinylmethyldialkoxysilanes, where alkoxy groups present may be, for example, ethoxy radicals and ethoxypropylene glycol ether radicals. Mention may also be made of monomers with hydroxyl or CO groups, examples being methacrylic and acrylic acid hydroxyalkyl esters such as hydroxyethyl, hydroxypropyl, or hydroxybutyl acrylate or hydroxybutyl methacrylate, and also compounds such as diacetoneacrylamide and acetylacetoxyethyl acrylate or acetylacetoxyethyl methacrylate.

Preference is given to one or more polymers selected from the group encompassing vinyl ester homopolymers, vinyl ester copolymers comprising one or more vinyl ester units and one or more monomer units from the group encompassing olefins, vinylaromatics, vinyl halides, acrylic esters, methacrylic esters, monoesters or diesters of fumaric and/or maleic acid, or silicon-functional comonomers; (meth)acrylic ester homopolymers or (meth)acrylic ester copolymers comprising one or more (meth)acrylic ester units and one or more monomer units from the group encompassing olefins, vinylaromatics, vinyl halides, monoesters or diesters of fumaric and/or maleic acid, or silicon-functional comonomers; homopolymers or copolymers of dienes such as butadiene or isoprene, and also of olefins such as ethene or propene, it being possible for the dienes to be copolymerized with, for example, styrene, (meth)acrylic esters, or the esters of fumaric or maleic acid; homopolymers or copolymers of vinylaromatics, such as styrene, methylstyrene, vinyltoluene; homopolymers or copolymers of vinyl halogen compounds such as vinyl chloride, comprising one or more monomer units from the group encompassing vinyl esters, olefins, and methacrylic esters and acrylic esters, it being possible for the polymers also to contain auxiliary monomers in the amounts stated above.

Particularly preferred are copolymers of one or more vinyl esters, more particularly vinyl acetate, with 1 to 50 wt % of ethylene; copolymers of vinyl acetate with 1 to 50 wt % of one or more other comonomers from the group of vinyl esters having 1 to 12 C atoms in the carboxylic acid radical, such as vinyl propionate, vinyl laurate, vinyl esters of alpha-branched carboxylic acids having 9 to 13 C atoms such as VeoVa9, VeoVa10, VeoVa11, and optionally 1 to 50 wt % of ethylene; copolymers of one or more vinyl esters, 1 to 50 wt % of ethylene, and preferably 1 to 60 wt % of (meth)acrylic esters of unbranched or branched alcohols having 1 to 15 C atoms, more particularly n-butyl acrylate or 2-ethylhexyl acrylate; and copolymers with 30 to 75 wt % of vinyl acetate, 1 to 30 wt % of vinyl laurate or vinyl esters of an alpha-branched carboxylic acid and 9 to 11 C atoms, and also 1 to 30 wt % of (meth)acrylic esters of unbranched or branched alcohols having 1 to 15 C atoms, more particularly n-butyl acrylate or 2-ethylhexyl acrylate, which also contain 1 to 40 wt % of ethylene; copolymers with one or more vinyl esters, 1 to 50 wt % of ethylene, and 1 to 60 wt % of vinyl chloride; the polymers may additionally contain the stated auxiliary monomers in the amounts stated above, and the figures in wt % add up to 100 wt % in each case.

Particularly preferred are also (meth)acrylic esters polymers, such as copolymers of n-butyl acrylate or 2-ethylhexyl acrylate, or copolymers of methyl methacrylate with n-butyl acrylate and/or 2-ethylhexyl acrylate; styrene-acrylic ester copolymers with one or more monomers from the group of methyl acrylate, ethyl acrylate, propyl acrylate, n-butyl acrylate, and 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate, and optionally ethylene; styrene-1,3-butadiene copolymers; the polymers may also contain auxiliary monomers in the stated amounts, and the figures in wt % add up to 100 wt % in each case.

Examples of particularly preferred comonomers for vinyl chloride copolymers are α-olefins, such as ethylene or propylene, and/or vinyl esters, such as vinyl acetate, vinyl laurate, or vinyl esters of an alpha-branched carboxylic acid having 9 to 11 C atoms, and/or acrylic esters and/or methacrylic esters of alcohols with 1 to 15 C atoms, such as methyl acrylate and methyl methacrylate, ethyl acrylate, ethyl methacrylate, propyl acrylate, propyl methacrylate, n-butyl-acrylate, tert-butyl acrylate, n-butyl methacrylate, tert-butyl methacrylate, 2-ethylhexyl acrylate and/or monoesters or diesters of fumaric and/or maleic acid, such as the dimethyl, methyl tert-butyl, di-n-butyl, di-tert-butyl, and diethyl esters of maleic and/or fumaric acid.

The most preferred are copolymers with vinyl acetate and 5 to 50 wt % of ethylene; or copolymers with vinyl acetate, 1 to 50 wt % of ethylene, and 1 to 50 wt % of a vinyl ester of α-branched monocarboxylic acids having 9 to 11 C atoms; or copolymers with 30 to 75 wt % of vinyl acetate, 1 to 30 wt % of vinyl laurate or vinyl esters of an alpha-branched carboxylic acid having 9 to 11 C atoms, and also 1 to 30 wt % of (meth)acrylic esters of unbranched or branched alcohols having 1 to 15 C atoms, which also contain 1 to 40 wt % of ethylene; or copolymers with vinyl acetate, 5 to 50 wt % of ethylene, and 1 to 60 wt % of vinyl chloride.

The most preferred copolymers are also vinyl chloride-ethylene copolymers containing 60 to 98 wt % of vinyl chloride units and 1 to 40 wt % of ethylene units, the figures in wt % being based on the total weight of the copolymer and adding up in each case to 100 wt %. Vinyl chloride-ethylene copolymers of these kinds are known from EP 0 149 098 A2.

The monomer selection and the selection of the weight fractions of the comonomers are made here so as to result in a glass transition temperature, Tg, of −50° C. to +50° C., preferably −40° C. to +40° C., more preferably −20° C. to +30° C. The glass transition temperature Tg of the polymers can be determined in a known way by means of Differential Scanning Calorimetry (DSC). The Tg may also be calculated approximately in advance using the Fox equation. According to Fox T. G., Bull. Am. Physics Soc. 1, 3, page 123 (1956) the following is the case: $1/Tg=x1/Tg1+x2/Tg2+ \ldots +xn/Tgn$, where xn stands for the mass fraction (wt %/100) of the monomer n, and Tgn is the glass transition temperature, in kelvins, of the homopolymer of the monomer n. Tg values for homopolymers are listed in Polymer Handbook 2nd Edition, J. Wiley & Sons, New York (1975).

The polymers are prepared generally in an aqueous medium and preferably by the emulsion or suspension polymerization process—as described in DE-A 102008043988, for example. The polymers in that case are obtained in the form of aqueous dispersions. In the polymerization it is possible to use the customary protective colloids and/or emulsifiers, as described in DE-A 102008043988. The protective colloids may be anionic or, preferably, cationic or nonanionic. Also preferred are combinations of cationic and nonionic protective colloids. Preferred nonionic protective colloids are polyvinyl alcohols. Preferred cationic protective colloids are polymers which carry one or more cationic charges, as described in E. W. Flick, Water Soluble Resins—an Industrial Guide, Noyes Publications, Park Ridge, N.J., 1991, for example. As protective colloids preference is given to partially hydrolyzed or fully hydrolyzed polyvinyl alcohols, having a degree of hydrolysis of 80 to 100 mol %, more particularly to partially hydrolyzed polyvinyl alcohols having a degree of hydrolysis of 80 to 94 mol % and a Hoppler viscosity, in 4% strength aqueous solution, of 1 to 30 mPas (Hoppler method at 20° C., DIN 53015). The stated protective colloids can be obtained by methods known to the skilled person, and are added generally in an amount of in total 1 to 20 wt %, based on the total weight of the monomers, in the polymerization.

The polymers in the form of aqueous dispersions may be converted, as described in DE-A 102008043988, for example, into corresponding powders that are redispersible in water. In that case it is usual to use a drying aid in a total amount of 3 to 30 wt %, preferably 5 to 20 wt %, based on the polymeric constituents of the dispersion. A preferred drying aid are the abovementioned polyvinyl alcohols.

The gypsum-containing construction material compounds may further comprise the customary aggregates and admixtures. Customary aggregates encompass lime hydrate at preferably 1 to 10 wt %, based on the dry weight of the gypsum-containing construction material compounds, and/or inert fillers. Examples of inert fillers are silica sand, finely ground quartz, finely ground limestone, calcium carbonate, dolomite, clay, chalk, white lime hydrate, talc or mica, rubber granules or hard fillers, such as aluminum silicates, corundum, basalt, carbides, such as silicon carbide or titanium carbide. Preferred inert fillers are silica sand, finely ground quartz, finely ground limestone, calcium carbonate, calcium magnesium carbonate (dolomite), chalk, or white lime hydrate; silica sand, finely ground quartz, or finely ground limestone are particularly preferred. The aggregates may also encompass gravel. Gravel generally has diameters of ≥2 mm.

The aggregates have average particle diameters of preferably 50 μm to 2.0 mm, more preferably 50 μm to 1.5 mm, and most preferably 50 to 800 μm (determinable by means of laser diffraction analysis or sieve analysis).

With admixtures it is possible to improve the processing qualities of the gypsum-containing construction material compounds and/or the properties of construction products fabricated using them. Customary admixtures are thickeners, examples being polysaccharides such as cellulose ethers and modified cellulose ethers, starch ethers, guar gum, xanthan gum, polycarboxylic acids such as polyacrylic acid and the partial esters thereof, and also polyvinyl alcohols, which may optionally have been acetalized or modified for hydrophobicity, casein, and associative thickeners. Other customary admixtures are retarders such as hydroxycarboxylic acids, or dicarboxylic acids or their salts, amino acids and modified amino acids, especially N-polyoxymethylene-amino acid, saccharides, oxalic acid, succinic acid, tartaric acid, gluconic acid, citric acid, sucrose, glucose, fructose, sorbitol, pentaerythritol, or phosphates. Other admixtures are setting accelerators, examples being alkali metal salts or alkaline earth metal salts of organic or inorganic acids. Further examples of admixtures are salts of long-chain fatty acids such as Ca stearate, Na oleate, and silicone architectural preservatives. The following may additionally be mentioned: preservatives, film-forming assistants, dispersants, foam stabilizers, defoamers, plasticizers, superplasticizers, and flame retardants (e.g., aluminum hydroxide).

In preferred embodiments of the gypsum-containing construction material compounds of the invention, the admixtures comprise one or more hydrophobizing additives. Hydrophobizing additives preferably comprise one or more organosilicon compounds.

Suitable organosilicon compounds encompass, for example, silanes such as tetraorganosilanes $SiR_4$ and organoorganoxysilanes $SiR_n(OR')_{4-n}$ with n=1 to 3, polymethylhydrogensiloxanes, siloxane resins, polysilanes preferably of the general formula $R_3Si(SiR_2)_nSiR_3$ with n=0 to 500, organosilanols such as $SiR_n(OH)_{4-n}$, disiloxanes, oligosiloxanes, polysiloxanes for example composed of units of the general formula $R_cH_dSi(OR')_e(OH)_fO_{(4-c-d-e-f)/2}$ with c=0 to 3, d=0 to 1, e=0 to 3, f=0 to 3, and with the sum c+d+e+f per unit being no more than 3.5, with R in each case being identical or different and denoting branched or unbranched alkyl radicals having 1 to 22 C atoms, cycloalkyl radicals having 3 to 10 C atoms, alkylene radicals having 2 to 4 C atoms, and also aryl, aralkyl, and alkylaryl radicals having 6 to 18 C atoms, and R' denoting identical or different alkyl radicals and alkoxyalkylene radicals having in each case 1 to 4 C atoms, preferably methyl and ethyl, it also being possible for the radicals R and R' to be substituted by halogens such as chlorine, by ether, thioether, ester, amide, nitrile, hydroxyl, amine, carboxyl, sulfonic acid, carboxylic anhydride, and carbonyl groups, and in the case of the polysilanes it also being possible for R to have the definition OR'.

Further examples of the organosilicon compounds are organosiliconates, more particularly alkyl siliconates, such as monomeric or oligomeric alkylsilanetriols. Organosiliconates are obtainable, for example, by reaction of one or more organoalkoxysilanes with one or more polyhydroxy compounds or, preferably, with one or more alkali metal lyes. Organoalkoxysilanes preferred for the preparation of organosiliconates are methyltrimethoxysilane, methyltriethoxysilane, ethyltrialkoxysilane, propyltri-methoxysilanes, butyltrimethoxysilanes, pentyltri-alkoxysilanes, hexyltrimethoxysilanes, heptyltrimethoxysilanes, octyltrimethoxysilanes. Examples of alkali metal lyes are sodium hydroxide or potassium hydroxide, more particularly in the form of their aqueous solutions. Examples of suitable polyhydroxy compounds are alkanediols, such as ethylene glycol, diethylene glycol, triethylene glycol, polyethylene glycol, 1,2-propanediol or 1,3-propanediol, alkanetriols, such as glycerol, alkanetetrols, such as pentaerythritol, hydroxycarboxylic acids, such as lactic acid, citric acid, or tartaric acid, saccharides, such as sugars, more particularly glucose, sucrose, or fructose, or starch. The reaction products may comprise basic or acidic constituents, examples being catalysts which may be added in order to promote the elimination of alkoxy groups. Methods for producing organosiliconates are described in WO 2012/022544, DE-A 102011076344.9 or DE A 10107614, for example.

Particularly preferred organosilicon compounds are methyl-trimethoxysilane, methyltriethoxysilane, ethyltrimethoxysilane, ethyltriethoxysilane, propyltrimethoxysilanes, propyltriethoxysilanes, n-butyltrimethoxysilane, isobutyltrimethoxysilane, pentyltrimethoxysilanes, hexyltrimethoxysilanes, cyclohexyltrimethoxysilane, methyltripropoxysilane, methyltri-(ethoxyethoxy)silane, vinyltri(methoxyethoxy)silane, (meth)acryloyloxypropyl-trimethoxysilane, (meth)acryloyloxypro-pyltriethoxysilane, γ-chloropropyltriethoxysilane, β-nitrilo-ethyltriethoxysilane, γ-mercaPtopropyltrimethoxysilane, γ-mer-captopropyltriethoxysilane, phenyltriethoxysilane, heptyltrimethoxysilane, heptyltriethoxysilanes, isooctyltri-ethoxysilane, n-octyltriethoxysilane, hexadecyltriethoxysilanes, dipropyldiethoxysilanes, methylphenyldiethoxysilane, diphenyldimethoxysilane, methylvinyltri(ethoxyethoxy)silane, tetramethyldiethoxy-disilane, trimethyltrimethoxydisilane, trimethyltriethoxydisilane, dimethyltetramethoxydisilane, dimethyltetraethoxydisilane, methylhydrogenpolysiloxanes endblocked with trimethylsiloxy groups, copolymers endblocked with trimethylsiloxy groups and composed of dimethylsiloxane and methylhydrogensiloxane units, dimethylpolysiloxanes, and also dimethylpolysiloxanes with Si—OH groups in the terminal units. Particularly preferred organosilicon compounds are also the abovementioned organosiliconates.

Preferred hydrophobizing additives comprise one or more organosilicon compounds applied to one or more supports. Suitable supports are based, for example, on inorganic particles, water-soluble organic polymers, or water-insoluble organic polymers. Examples of inorganic particles are aluminosilicates, such as zeolite or metakaolin, flyash, loam, lime, carbonates. Examples of water-soluble organic polymers are starch, celluloses, or polyvinyl alcohols. The water-insoluble inorganic polymers are preferably the polymers described earlier on above and based on one or more ethylenically unsaturated monomers. With particular preference the water-insoluble organic polymers are present in the form of the powders redispersible in water, described earlier on above.

The hydrophobizing additives optionally comprising supports are present preferably in solid form, more particularly in particulate form. The organosilicon compounds and supports are preferably mixed before the hydrophobizing additives are incorporated into the gypsum-containing construction material compounds. In this case the organosilicon compounds are preferably adsorbed and/or applied to the supports. Corresponding methods for producing supported organosilicon compounds are described in WO 2008/062018, WO 2010/012654, or WO 2010/052201, for example. Particularly preferred, however, are hydrophobizing additives which do not include supports.

It is also preferred for a combination of at least two hydrophobizing additives to be used. Preferred combinations encompass an organosiliconate based on at least one methyltrialkoxysilane and an organosiliconate based on at least one silane from the group encompassing ethyltri-alkoxysilane, propyltrialkoxysilanes, butyltrialkoxysilanes, pentyltrialkoxysilanes, hexyltrialkoxysilanes, heptyltrialkoxysilanes, octyltrialkoxysilanes. Another preferred combination encompasses an organosiliconate based on at least one methyltrialkoxysilane, and also one or more organoorganoxysilanes, more particularly ethyltri-alkoxysilane, propyltrialkoxysilanes, butyltrialkoxysilanes, pentyltrialkoxysilanes, hexyltrialkoxysilanes, heptyltrialkoxysilanes, or octyltrialkoxysilanes.

Typical formulations of the gypsum-containing construction material compounds comprise in general 5 to 90 wt %, more particularly 5 to 80 wt %, of gypsum, 0.5 to 20 wt %, more particularly 1 to 10 wt %, of pozzolans, 0.5 to 30 wt % w more particularly 1 to 10 wt %, of cement, 0.5 to 50 wt %, more particularly 1 to 10 wt %, of polymer, 0 to 80 wt %, preferably 1 to 80 wt %, and more preferably 20 to 70 wt % of aggregates, and 0 to 10 wt %, more particularly 0.1 to 4 wt %, of admixtures. The hydrophobizing additives are included in the gypsum-containing construction material compounds preferably at 0 to 5 wt %, more particularly at 0.1 to 1 wt %.

The aforementioned figures in wt % are based on the dry weight of the gypsum-containing construction material compounds, and add up in total to 100 wt %.

The weight ratio of cement to pozzolan is preferably 1:4 to 4:1, and more preferably 1:3 to 3:1, and most preferably 1:2 to 2:1.

The total amount of gypsum and aggregates is preferably 50 to 98 wt %, more preferably 60 to 95 wt %, and most preferably 70 to 90 wt %, based in each case on the dry weight of the gypsum-containing construction material compounds.

In preferred embodiments the gypsum-containing construction material compounds are employed as construction adhesives, more particularly as tile adhesives, or as coating materials, more particularly as self-leveling compound or floor filling compound.

When used as construction adhesives, the gypsum-containing construction material compounds comprise in general 25 to 50 wt % of gypsum, 35 to 60 wt % of aggregates, the figures in wt % being based on the dry weight of the gypsum-containing construction material compounds and adding up in total to 100 wt %. In the case of use as construction adhesive, the further components may be used in accordance with the aforementioned typical formulation of the gypsum-containing construction material compounds.

In the case of use as coating materials, the gypsum-containing construction material compounds comprise in general 30 to 75 wt %, more particularly 40 to 60 wt %, of gypsum, 10 to 60 wt %, more particularly 25 to 45 wt %, of aggregates, with the figures in percent by weight being based on the dry weight of the gypsum-containing construction material compounds and adding up in total to 100 wt %. In the case of use as coating materials, the further components may be used in accordance with the aforementioned typical formulation of the gypsum-containing construction material compounds.

Prior to their application, water is added to the gypsum-containing construction material compounds, preferably 15 to 70 wt %. In the case of the construction adhesives, preferably 20 to 35 wt % and more preferably 15 to 30 wt % of water is added. Added to the coating materials is preferably 15 to 30 wt % and more preferably 19 to 25 wt % of water. The above-stated figures concerning the wt % of water are based in each case on the dry weight of the gypsum-containing construction material compound in question. The stated quantities of water are conducive to production of construction material compounds having the desired processing properties.

To produce the gypsum-containing construction material compounds, the suitable mixers are used to mix and to homogenize gypsum, cement, pozzolans, optionally aggregates, optionally admixtures, and optionally polymers, more particularly in the form of aqueous polymer dispersions or, preferably, in the form of polymer powders redispersible in water. In an alternative procedure the polymers, in the form of aqueous dispersions or aqueous redispersions of polymer powders redispersible in water, are mixed with a mixture of the other, dry components of the gypsum-containing construction material compounds (2-component construction material compound). Preferably, however, a dry mixture is produced, and the water required for working is added immediately prior to working.

The gypsum-containing construction material compounds of the invention are suitable in particular for use as gypsum mortars, such as, for example, coating materials, construction adhesives, or other common applications. Examples of construction adhesives are adhesive mortars, bedding mortars, or tile adhesives for tiles of all kinds, such as earthenware, stoneware, fine-stoneware, ceramic, or natural tiles, in the interior or exterior segments. Examples of coating materials are filling compounds, for walls or floors, for example, in the interior or exterior segments, self-leveling $CaSO_4$ screeds, and plasters or renders, in the interior or exterior segment. Other common applications are joint fillers or jointing compounds. The gypsum-containing construction material compounds may also be used, furthermore, for producing gypsum boards or gypsum molds. Other applications are, for example, plasters, renders or stucco work, including such applications in the exterior segment.

Construction products produced from the gypsum-containing construction material compounds of the invention are, surprisingly, resistant even under humid or wet conditions, and even, more particularly, in the case of freeze/thaw alternation, and after such exposures they display substantially better strength values or mechanical properties than construction products made from conventional gypsum-containing compounds. With the construction material compounds of the invention, accordingly, it is possible to achieve decisive improvements in the tensile adhesive strength, tensile flexural strength, compressive strength, abrasion resistance, water absorption, and hence the weathering resistance of gypsum-based construction products. Even after storage in water, indeed, the construction products of the invention attain the strength levels of cementitious systems. From a performance standpoint, therefore, the construction material compounds of the invention are an equivalent replacement for cementitious construction material compounds, but with the advantage that gypsum is obtainable with much less expenditure of energy in contrast to cement.

All in all, therefore, the gypsum-containing construction material compounds of the invention are notable for outstanding water resistance. These effects are produced surprisingly by the synergistic interactions between gypsum, cement, and the pozzolans. By addition of polymers and/or hydrophobizing additives, more particularly organosilicon compound, this effect is boosted even further synergistically. The following examples serve for further elucidation of the invention:

Production of the Gypsum-containing Construction Material Compounds:

A dry mix was first produced from the components of the respective formulation of inventive/comparative examples 1 to 6, by the homogeneous mixing of all of the components of the respective formulation, apart from the mixing water. The respective amount of mixing water was added subsequently, and the resulting mixture was mixed homogeneously.

INVENTIVE EXAMPLE 1

Formulation of the Tile Adhesive:

| | |
|---|---|
| Hard plaster of paris HF1 (alpha-hemihydrate) | 400 parts by weight |
| Portland cement CEM I 42.5 | 50 parts by weight |
| Silica sand BCS 413 | 451 parts by weight |
| Metastar 501 metakaolin | 50 parts by weight |
| Culminal C 9133 cellulose ether | 5 parts by weight |
| Retardan P retardant | 2 parts by weight |
| Potassium sulfate accelerator | 2 parts by weight |
| VINNAPAS 4023 N dispersion powder (polyvinyl alcohol-stabilized, water-redispersible dispersion powder based on a copolymer of vinyl acetate and ethylene). | 40 parts by weight |

Mixing water: 280 ml of water to 1000 g of dry mix.

INVENTIVE EXAMPLE 2

Formulation of the Floor Filling Compound:

| | |
|---|---|
| Hard plaster of paris HF1 (alpha-hemihydrate) | 500.0 parts by weight |
| Light spar accelerator | 5.0 parts by weight |
| Portland cement white CEM I 42.5 R | 75.0 parts by weight |
| Silica sand BCS 413 | 209.3 parts by weight |
| Omyacarb 6 AL calcium carbonate | 103.0 parts by weight |
| Metastar 501 metakaolin | 75.0 parts by weight |
| Agitan P 800 defoamer | 2.0 parts by weight |
| Retardan P retardant | 0.4 parts by weight |
| Melment F 17 G superplasticizer | 5.0 parts by weight |
| Tylose H 300 P 2 cellulose ether | 0.3 parts by weight |
| VINNAPAS 5025 L dispersion powder (polyvinyl alcohol-stabilized, water-redispersible dispersion powder based on a copolymer of vinyl acetate and ethylene). | 25.0 parts by weight |

Mixing water: 280 ml of water to 1000 g of dry mix.

COMPARATIVE EXAMPLE 3

Formulation of the Tile Adhesive:

| | |
|---|---|
| Hard plaster of paris HF1 (alpha-hemihydrate) | 400 parts by weight |
| Silica sand BCS 413 | 551 parts by weight |
| Culminal C 9133 cellulose ether | 5 parts by weight |
| Retardan P retardant | 2 parts by weight |
| Potassium sulfate accelerator | 2 parts by weight |
| VINNAPAS 4023 N dispersion powder | 40 parts by weight. |

Mixing water: 240 ml of water to 1000 g of dry mix.

COMPARATIVE EXAMPLE 4

Formulation of the Tile Adhesive:

| | |
|---|---|
| Hard plaster of paris HF1 (alpha-hemihydrate) | 400 parts by weight |
| Portland cement CEM I 42.5 | 50 parts by weight |
| Silica sand BCS 413 | 501 parts by weight |
| Culminal C 9133 cellulose ether | 5 parts by weight |
| Retardan P retardant | 2 parts by weight |
| Potassium sulfate accelerator | 2 parts by weight |
| VINNAPAS 4023 N dispersion powder | 40 parts by weight. |

Mixing water: 250 ml of water to 1000 g of dry mix.

COMPARATIVE EXAMPLE 5

Formulation of the Tile Adhesive:

| | |
|---|---|
| Hard plaster of paris HF1 (alpha-hemihydrate) | 400 parts by weight |
| Metastar 501 metakaolin | 50 parts by weight |
| Silica sand BCS 413 | 501 parts by weight |
| Culminal C 9133 cellulose ether | 5 parts by weight |
| Retardan P retardant | 2 parts by weight |
| Potassium sulfate accelerator | 2 parts by weight |
| VINNAPAS 4023 N dispersion powder | 40 parts by weight. |

Mixing water: 270 ml of water to 1000 g of dry mix.

COMPARATIVE EXAMPLE 6

Formulation of the Floor Filling Compound:

| | |
|---|---|
| Hard plaster of paris HF1 (alpha-hemihydrate) | 500.0 parts by weight |
| Light spar accelerator | 5.0 parts by weight |

-continued

| | |
|---|---|
| Portland cement white CEM I 42.5 R | 10.0 parts by weight |
| Silica sand BCS 413 | 349.3 parts by weight |
| Omyacarb 6 AL calcium carbonate | 103.0 parts by weight |
| Agitan P 800 defoamer | 2.0 parts by weight |
| Retardan P retardant | 0.4 parts by weight |
| Melment F 17 G superplasticizer | 5.0 parts by weight |
| Tylose H 300 P 2 cellulose ether | 0.3 parts by weight |
| VINNAPAS 5025 L dispersion powder | 25.0 parts by weight. |

Mixing water: 240 ml of water to 1000 g of dry mix.

Testing of the Gypsum-containing Construction Material Compounds:

The gypsum-containing tile adhesives of inventive/comparative examples 1, 3, 4, and 5 were each tested in accordance with European tile adhesive standard EN 1348. The tensile adhesive strength here was determined after the following storage conditions:
SC: 28 days (d) standard conditions storage (SC);
Wet: 7 d SC and 21 d wet storage;
Heat: 14 d SC and 14 d hot storage at 70° C.;
Freeze/thaw: 7 d SC, 21 d wet, and 7d alternating freeze/thaw storage.

The results of the testing of inventive/comparative examples 1, 3, 4, and 5 are summarized in table 1.

TABLE 1

Results of testing of the tile adhesives of inventive/comparative examples 1, 3, 4, and 5:

| Inventive/ comparative example | SC [N/mm$^2$] | Wet [N/mm$^2$] | Heat [N/mm$^2$] | Freeze/thaw [N/mm$^2$] |
|---|---|---|---|---|
| 1 | 1.2 | 0.78 | 1.28 | 0.8 |
| 3 | 1.2 | 0.1 | 1.2 | 0.2 |
| 4 | 1.4 | 0.4 | 1.2 | 0.4 |
| 5 | 1.3 | 0.2 | 1.2 | 0.1 |

The gypsum-containing floor filling compounds of inventive/comparative examples 2 and 6 were each tested in accordance with the French CSTB specification for floor leveling compounds, for exposure class P4. The following parameters were determined here after the following storage conditions:

FT-SC: flexural tensile strength after 28 d SC storage;
FT-wet: flexural tensile strength after wet storage;
CS-SC: compressive strength after 28 d SC storage;
CS-wet: compressive strength after wet storage;
TAS-SC: tensile adhesive strength after 28 d SC storage;
TAS-wet: tensile adhesive strength after wet storage.

The results of the testing of inventive/comparative examples 2 and 4, respectively, are summarized in table 2.

TABLE 2

Results of the testing of the floor filling compounds of inventive/comparative examples 2 and 6:

| Inventive/ comparative example | CS-SC [N/mm$^2$] | CS-wet [N/mm$^2$] | FT-SC [N/mm$^2$] | FT-wet [N/mm$^2$] | TAS-SC [N/mm$^2$] | TAS-wet [N/mm$^2$] |
|---|---|---|---|---|---|---|
| 2 | 48.3 | 26.4 | 13.8 | 5.7 | 2.5 | 2.2 |
| 6 | 27.1 | 11.6 | 8.2 | 2.3 | 2.6 | 0.7 |

The results with the tile adhesives in table 1 demonstrate that with the inventive tile adhesive (example 1) a tensile adhesive strength achieved after wet storage and after freeze/thaw storage is many times higher than with the tile adhesives of comparative examples 3, 4, and 5. The tensile adhesive strengths after SC and hot storage are at a comparable level for all of the tile adhesive formulations of inventive/comparative examples 1 and 3, 4, and 5, respectively.

The results in table 2 demonstrate that the inventive floor filling compound (example 2), both after SC storage and after wet storage, results in flexural tensile strengths and compressive strengths which are significantly above those for comparative example 6. With example 2, the tensile adhesive strength after wet storage is likewise significantly higher than with comparative example 6.

The results therefore show that with the gypsum-containing construction material compounds of the invention, construction products are obtainable which possess better strength values or mechanical properties under humid or wet conditions than conventional gypsum-containing construction products.

Production of Hydrophobized, Gypsum-containing Construction Material Compounds:

EXAMPLE 7

Like example 1, with the sole difference that the dry mix was additionally admixed with 3 parts by weight of pulverulent potassium methylsiliconate (siliconate from preparation example 2 of WO 2012/022544: molar ratio of potassium to silicon=0.64).

EXAMPLE 8

Like example 1, with the sole difference that the dry mix was additionally admixed with 3 parts by weight of pulverulent potassium isobutylsiliconate (siliconate Via from DE-A 102011076344.9: molar ratio of potassium to silicon=1.00).

EXAMPLE 9

Like example 1, with the sole difference that the dry mix was additionally admixed with 5 parts by weight of silane powder (silane powder from example 3b of EP 1394198: an alkyltrialkoxysilane supported on polyvinyl alcohol).

EXAMPLE 10

Like example 7, with the sole difference that the dry mix was additionally admixed with 3 parts by weight of the pulverulent potassium isobutylsiliconate from example 8.

EXAMPLE 11

Like example 7, with the sole difference that the dry mix was additionally admixed with 5 parts by weight of the silane powder from example 9.

Testing of the Hydrophobized, Gypsum-containing Construction Material Compounds:

The hydrophobized, gypsum-containing tile adhesives of examples 7 to 11 and the gypsum-containing tile adhesive of example 1 were each tested for their water absorption in accordance with European standard EN 520.

After 28-day storage under standard conditions, and subsequent drying to constant weight, there followed two-hour water storage, as described in EN 520. The results of the testing are summarized in table 3.

The results in table 3 demonstrate that the addition of inventive organosilicon compounds to the gypsum-containing tile adhesives leads to a very efficient hydrophobizing of the tile adhesives. The water absorption drops significantly, by up to 90%. The combined use of two additives (examples 10 and 11) proved to be particularly advantageous.

TABLE 3

Results of testing of the hydrophobized tile adhesives:

| Example | Water absorption to EN 520 (wt %)[a] | Reduction in water absorption in (%) |
|---|---|---|
| 1 | 7.83 | 0 |
| 7 | 2.85 | 63.6 |
| 8 | 6.27 | 19.9 |
| 9 | 4.59 | 41.4 |
| 10 | 0.79 | 90.0 |
| 11 | 0.93 | 88.2 |

[a]Increase in mass of the respective specimen after water storage, based on the mass prior to water storage.

The invention claimed is:

1. A gypsum-containing construction material compound, comprising:
   30 to 75 wt% of gypsum,
   1 to 10 wt% of metakaolin,
   1 to 10 wt% of cement,
   1 to 10 wt% of at least one polymer,
   10 to 60 wt% of aggregates,
   0 to 5 wt% of hydrophobizing additives, and
   0 to 10 wt% of admixtures,
   wherein the figures in wt% are based on a dry weight of the gypsum-containing construction material compound and add up in total to 100 wt% and the at least one polymer is a member selected from the group consisting of: (a) vinyl ester homopolymers, (b) vinyl ester copolymers comprising one or more vinyl ester units and one or more monomer units selected from the group consisting of olefins, vinylaromatics, vinyl halides, acrylic esters, methacrylic esters, monoesters of fumaric acid, monoesters of maleic acid, diesters of fumaric acid and diesters of maleic acid, (c) homopolymers of vinyl halogen compounds, and (d) copolymers of vinyl halogen compounds comprising at least one monomer unit selected from the group consisting of vinyl esters, olefins, methacrylic esters and acrylic esters.

2. The gypsum-containing construction material compound as claimed in claim 1, wherein the gypsum is selected from the group consisting of α- or β-hemihydrate ($CaSO_4 \cdot \frac{1}{2} H_2O$), dihydrate, anhydrite, and a calcium sulfate obtained during flue gas desulfurization (FGD gypsum).

3. The gypsum-containing construction material compound of claim 1, wherein the aggregates are selected from the group consisting of lime hydrate, silica sand, ground quartz, ground limestone, calcium carbonate, dolomite, clay, chalk, white lime hydrate, talc, mica, rubber granules, fillers, and carbides.

4. The gypsum-containing construction material compound as claimed in claim 1, wherein a weight ratio of cement to metakaolin is 1:2 to 2:1.

5. The gypsum-containing construction material compound as claimed in claim 1, wherein a total amount of gypsum and aggregates is 60 to 95 wt%, based on a dry weight of the gypsum-containing construction material compound.

6. The gypsum-containing construction material compound as claimed in claim 1, wherein one or more admixtures comprise organosilicon compounds selected from the group consisting of silanes, polymethylhydrogensiloxanes, siloxane resins, polysilanes, organosilanols, disiloxanes, oligosiloxanes, polysiloxanes, and organosiliconates, it being possible for the organosilicon compounds to be present optionally immobilized on a support or encapsulated in an encapsulating material.

7. The gypsum-containing construction material compound as claimed in claim 1, which is a gypsum mortar.

8. The gypsum-containing construction material compound as claimed in claim 1, which is a member selected from the group consisting of a adhesive mortar, a bedding mortar, a tile adhesive, a filling compound, a self-leveling compound, a plaster, render, joint filler, jointing compound, a gypsum board component, a gypsum mold component, or stucco component.

9. The gypsum-containing construction material compound of claim 1, wherein the metakaolin is the only pozzolan in the compound.

10. The gypsum-containing construction material compound of claim 1, consisting of
    30 to 75 wt% of the gypsum,
    1 to 10 wt% of the metakaolin,
    1 to 10 wt% of the cement,
    1 to 10 wt% of the at least one polymer,
    10 to 60 wt% of the aggregates,
    0 to 5 wt% of the hydrophobizing additives, and
    0 to 10 wt% of the admixtures.

11. The gypsum-containing construction material compound of claim 2, wherein the aggregates are selected from the group consisting of lime hydrate, silica sand, ground quartz, ground limestone, calcium carbonate, dolomite, clay, chalk, white lime hydrate, talc, mica, rubber granules, fillers, and carbides.

12. The gypsum-containing construction material compound as claimed in claim 11, wherein a weight ratio of cement to metakolin is 1:2 to 2:1.

13. The gypsum-containing construction material compound as claimed in claim 12, wherein a total amount of gypsum and aggregates is 60 to 95 wt%, based on a dry weight of the gypsum-containing construction material compound.

14. The gypsum-containing construction material compound as claimed in claim 13, wherein one or more admixtures comprise organosilicon compounds selected from the group consisting of silanes, polymethylhydrogensiloxanes, siloxane resins, polysilanes, organosilanols, disiloxanes, oligosiloxanes, polysiloxanes, and organosiliconates, it being possible for the organosilicon compounds to be present optionally immobilized on a support or encapsulated in an encapsulating material.

15. The gypsum-containing construction material compound as claimed in claim 14, which is a gypsum mortar.

16. The gypsum-containing construction material compound as claimed in claim 14, which is a member selected from the group consisting of an adhesive mortar, a bedding mortar, a tile adhesive, a filling compound, a self-leveling compound, a plaster, a render, a joint filler, a jointing compound, a gypsum board component, a gypsum mold component, and a stucco component.

\* \* \* \* \*